(12) United States Patent
Diggins

(10) Patent No.: US 11,341,747 B2
(45) Date of Patent: *May 24, 2022

(54) GENERATION OF VIDEO HASH

(71) Applicant: Grass Valley Limited, Newbury (GB)

(72) Inventor: Jonathan Diggins, Waterloo (GB)

(73) Assignee: GRASS VALLEY LIMITED, Newbury (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/020,066

(22) Filed: Sep. 14, 2020

(65) Prior Publication Data
US 2021/0064881 A1 Mar. 4, 2021

Related U.S. Application Data

(63) Continuation of application No. 15/981,322, filed on May 16, 2018, now Pat. No. 10,796,158.

(30) Foreign Application Priority Data

May 17, 2017 (GB) .................................... 1707940

(51) Int. Cl.
G06K 9/00 (2022.01)
G06V 20/40 (2022.01)
(Continued)

(52) U.S. Cl.
CPC ............ *G06V 20/46* (2022.01); *G06F 16/785* (2019.01); *G06K 9/00503* (2013.01);
(Continued)

(58) Field of Classification Search
CPC .......... G06K 9/00744; G06K 9/00758; G06K 9/00711; G06K 9/00718; G06K 9/00503;
(Continued)

(56) References Cited

U.S. PATENT DOCUMENTS 4,697,209 A   9/1987  Kiewit et al.
8,094,872 B1  1/2012  Yagnik et al.
(Continued)

FOREIGN PATENT DOCUMENTS

EP   2608107 A2   6/2013
GB   2489133 A    9/2012
(Continued)

OTHER PUBLICATIONS

Syeda-Mahmood, Tanveer, and Savitha Srinivasan. "Detecting topical events in digital video." Proceedings of the eighth ACM international conference on Multimedia. 2000.*
(Continued)

*Primary Examiner* — Li Liu
(74) *Attorney, Agent, or Firm* — ArentFox Schiff LLP

(57) ABSTRACT

An apparatus and method are providing for generating a hash in video in which a sample series of temporal difference are sampled in an image order. A temporal averaging is performed and a rate of change is detected to identify as distinctive events regions of high rate of change. Images having a distinctive event are labelled as distinctive images. For each image, the temporal spacing in images is calculated between that image and other distinctive images to provide a set of temporal spacings for that image; and a hash is derived for that image from that set of temporal spacings.

20 Claims, 12 Drawing Sheets

(51) Int. Cl.
*H04N 21/845* (2011.01)
*H04N 21/44* (2011.01)
*H04N 21/234* (2011.01)
*G06V 10/75* (2022.01)
*G06F 16/783* (2019.01)
*H04N 21/43* (2011.01)
*H04H 60/59* (2008.01)
*H04N 21/235* (2011.01)
*G06F 16/50* (2019.01)
*G06V 10/40* (2022.01)

(52) U.S. Cl.
CPC ............ *G06V 10/751* (2022.01); *G06V 20/41* (2022.01); *G06V 20/48* (2022.01); *H04N 21/23418* (2013.01); *H04N 21/44008* (2013.01); *H04N 21/8456* (2013.01); *G06F 16/50* (2019.01); *G06F 16/783* (2019.01); *G06V 10/40* (2022.01); *G06V 20/40* (2022.01); *H04H 60/59* (2013.01); *H04N 21/2353* (2013.01); *H04N 21/4307* (2013.01)

(58) Field of Classification Search
CPC ............ G06K 9/00765; G06K 9/6202; G06K 2009/00738; G06K 9/00261; G06K 9/00751; G06F 16/783; H04N 21/44008; H04N 21/23418
See application file for complete search history.

(56) References Cited

U.S. PATENT DOCUMENTS

| | | |
|---|---|---|
| 8,611,422 B1 | 12/2013 | Yagnik et al. |
| 8,732,858 B2 | 5/2014 | Wold |
| 2002/0083060 A1 | 6/2002 | Wang et al. |
| 2004/0148159 A1 | 7/2004 | Crockett et al. |
| 2006/0195861 A1 | 8/2006 | Lee |
| 2009/0154806 A1 | 6/2009 | Chang et al. |
| 2011/0173185 A1 | 7/2011 | Vogel |
| 2011/0173208 A1 | 7/2011 | Vogel |
| 2012/0242864 A1 | 9/2012 | Pauli |
| 2013/0163957 A1 | 6/2013 | Ikizyan et al. |
| 2013/0259323 A1 | 10/2013 | Deng |
| 2013/0289756 A1 | 10/2013 | Resch |
| 2015/0235379 A1 | 8/2015 | O'Gorman et al. |
| 2015/0254344 A1 | 9/2015 | Kulkarni et al. |
| 2017/0161304 A1 | 6/2017 | Diggins et al. |
| 2017/0344706 A1 | 11/2017 | Torres et al. |

FOREIGN PATENT DOCUMENTS

| | | |
|---|---|---|
| WO | 0211123 A2 | 2/2002 |
| WO | 2005041109 A2 | 5/2005 |
| WO | 2007148290 A2 | 12/2007 |
| WO | 2012091935 A1 | 7/2012 |

OTHER PUBLICATIONS

Search Report from the United Kingdom Intellectual Property Office for Application No. GB1707940.1 dated Oct. 31, 2017 (2 pages).
Extended European Search Report from the European Patent Office for Application No. 18173007.8 dated Sep. 10, 2018 (11 pages).

* cited by examiner

GENERATION OF VIDEO HASH

CROSS-REFERENCE TO RELATED APPLICATIONS

The present application is a continuation of U.S. patent application Ser. No. 15/981,322, filed May 16, 2018, which claims the benefit foreign priority based on GB1707940.1 filed May 17, 2017, the disclosures of each of which are hereby incorporated by reference in their entirety.

FIELD OF INVENTION

The present invention is in the field of video and audio and relates to the generation of an audio or video hash for use, for example, in the identification of content in databases.

BACKGROUND

Video databases store video files in data storage. The files may be numerous, and may require a large capacity of data storage. Due to the quantity of video stored it may therefore be difficult to find a specific video file. For example, it may be difficult, or too time consuming, to compare a video with the content of the database, and find all of the video files stored in the database that have matching content.

The same fundamental video content may exist in versions differing in qualities, frame rates, contrasts, coding levels and compression. At present it is difficult to search the video database effectively in order to identify different versions of video content.

Some previous methods of matching video content include forming a low resolution thumbprint of each image or identifying feature points in each image, and comparing these thumbprints or feature points with the content of the database. However, this method may still be sensitive to some forms of compression and image manipulation. Therefore another method is required in order to find video files in a video database, which is less sensitive to forms of manipulation or compression but nonetheless effective.

STATEMENTS OF INVENTION

In a first aspect, there is provided a method of generating an audio or video hash at a location in an input video signal formed of an image series. This method may comprise the steps of determining temporal difference data by comparing a first image at a location in the image series to an image in proximity to the first image in the image series and repeating this for a sequence of images in the image series. The method may then comprise conducting a defined filter process on the temporal difference data by calculating a rolling average of the temporal difference data, and then filtering the resulting data to identify regions of large rate change and the magnitude of the regions of large rate change. The method may comprise identifying distinctive temporally spaced events based on the identified regions of large rate changes, and the magnitude of the regions of large rate change, and for the location, calculating the temporal spacing between that location and each so of a plurality of distinctive events in the temporal neighbourhood of that location to provide a set of temporal spacings for that location. The method may further comprise deriving a hash for that location from the set of temporal spacings for that location.

In one embodiment of the present invention, a method of generating an audio or video hash at a location in an input audio or video signal is envisaged. The method may include conducting a defined filter process on said signal to identify distinctive temporally spaced events. The method may further include, for each location, calculating the temporal spacing between that location and each of a plurality of distinctive events in the temporal neighbourhood of that location to provide a set of temporal spacing's for that location. Moreover the method may further include deriving a hash for that location from the set of temporal spacing's for that location.

In another embodiment, a method of generating a hash for an image in a video sequence of images is envisaged. The method may include forming, for each image, a temporal difference sample representing a difference in pixel values between said image and an adjoining image, and forming a sample series of said temporal difference samples in image order. The method may further comprise conducting a defined filter process on said sample series to identify distinctive events and labelling as distinctive images those images in the video sequence having associated therewith a distinctive event. Moreover, for each image, calculating the temporal spacing in images between that image and each of a plurality of distinctive images in the temporal neighbourhood of that image to provide a set of temporal spacing's for that image; and deriving a hash for that image from the set of temporal spacing's for that image.

According to an aspect there may be provided a computer program product adapted to cause programmable apparatus to implement a method. The method may comprise conducting a defined filter process on temporal difference data indicative of the difference between images in an image series to identify regions of large rate of change of image composition, and the magnitude of the temporal difference data of these regions of large rate change. The method may further comprise identifying distinctive temporally spaced events based on the identified regions of large rate changes, and the magnitude of these regions. For the location, the method may comprise calculating the temporal spacing between that location and each of a plurality of distinctive events in the temporal neighbourhood of that location to provide a set of temporal spacings for that location; and deriving a hash for that location from the set of temporal spacings for that location.

According to an aspect there may be provided an apparatus for generating a hash for an image in a video sequence of images. The apparatus may comprise a first filter for receiving a sample series of said temporal difference samples in image order, each temporal difference sample representing a difference in pixel values between said image and an adjoining image, the first filter performing a temporal averaging of the sample series. The apparatus may further comprise a second filter for receiving said temporally averaged sample series and determining a rate of change to detect a distinctive event. The apparatus may further comprise a buffer arrangement for storing said distinctive events with the temporal location in the series of images of the associated image; and a hash generator receiving the temporal spacing in images between that image and each of a plurality of images in the temporal neighbourhood of that image having associated therewith a distinctive event, the hash generator deriving a hash for that image from the set of temporal spacings for that image.

A programmable apparatus may be programmed to implement either of the above described embodiments.

Moreover, a computer program product may be adapted to cause a programmable apparatus to implement a method in accordance with either of the above embodiments.

DETAILED DESCRIPTION OF THE FIGURES

Figure 1:
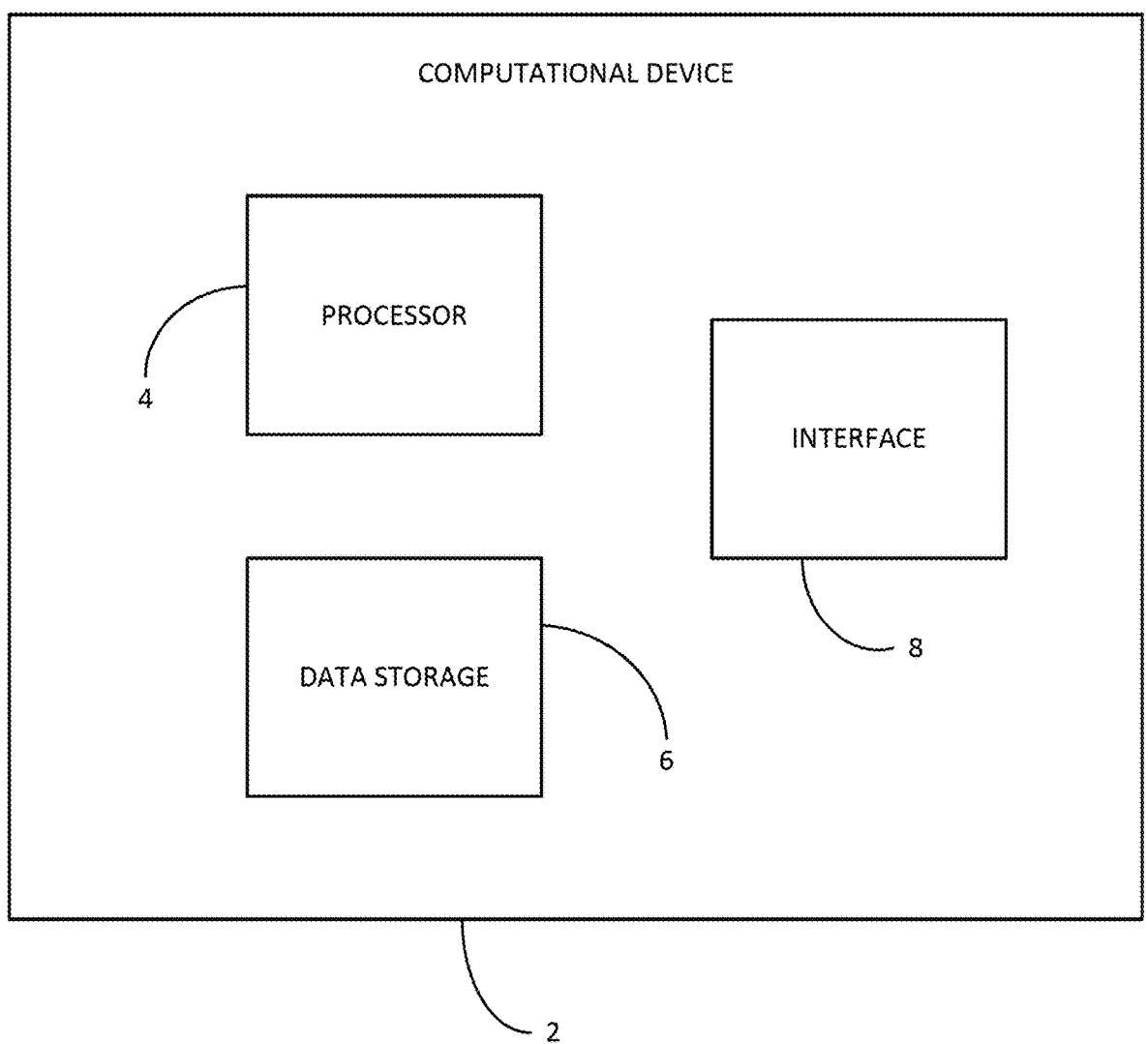
FIG. 1 shows a block diagram of a computing device.

FIG. 1 shows a computational device 2 such as a computer, hard drive, laptop or tablet. The computational device comprises a processor 4, a data storage 6 and an interface 8.

The data storage 6 is configured to store data. The data may take many forms but may preferably be data associated with a video or image stream, or data derived from a video such as essence data or hashes. The data storage 6 may also store instructions for applications, functions, or security provisions.

The interface 8 allows the computational device to interact with other computational devices. The interface 8 may be coupled to a Local area network (LAN) or a wide area network (WAN). The interface 8 alternatively may be directly coupled to another computation device, or to a plurality of computational devices. Through the interface data can be exchanged. For example, data can be received or sent by the computational device. The computational device may comprise a plurality of interfaces. Examples of data that can be sent or received include streams of video data.

The processor 4 is configured to perform functions upon data, whether that data is from the data storage, or is provided via the interface. The functions may include manipulating data according to an application. For example, the processor 4 may be programmed to form hashes from the video files stored in the data storage 6.

The processor 4 and the data storage 6 are coupled together so that the data storage 6 may allow the processor 4 access to the data stored therein. The processor 4 may also send data back to the data storage 6 (such as manipulated data, including hashes) so that it can be stored. For example, the processor 4 may manipulate video data in order to form hashes that may characterise that video data. The hashes may then be stored in the data storage 6. The hashes may be associated with the video files from which it is derived in the data store.

The processor 4 may also be coupled with the interface 8 so that data sent from another computational device to the interface can be processed. The data storage 6 may also be coupled with the interface 8 so that data sent from another computational device to the interface can be stored.

Figure 2:
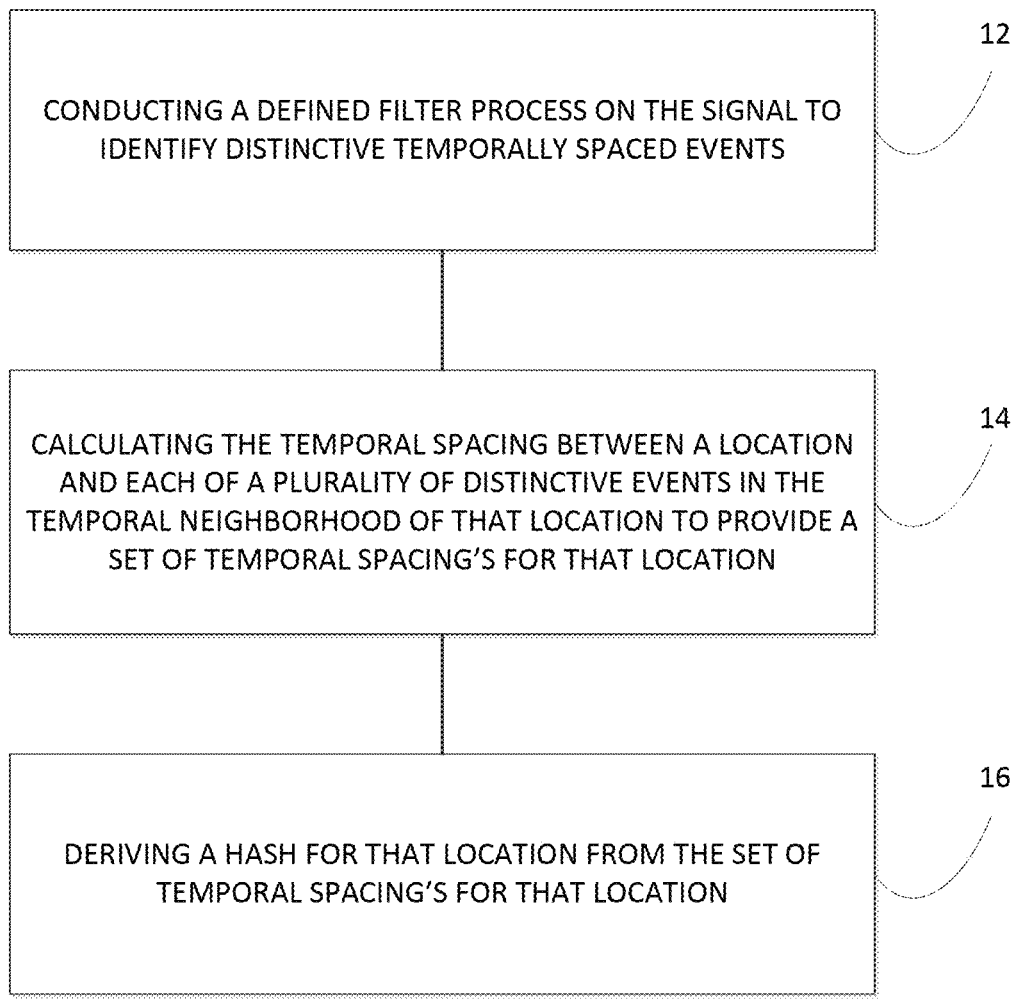
FIG. 2 shows a flow chart illustrating an embodiment of the invention.

FIG. 2 shows a flow diagram detailing a method of generating an audio or video hash at a location in an input audio or video signal.

The first step 12 in FIG. 2 comprises conducting a defined filter process on the signal to identify distinctive temporally spaced events.

The next step 14 comprises calculating the temporal spacing between a location and each of a plurality of distinctive events in the temporal neighbourhood of that location to provide a set of temporal spacing's for that location. This is done for every image in the image stream. In an alternative embodiment this is done for every location identified in the previous stage. Alternatively a subset of the identified events may be selected to calculate the temporal spacing's.

The final step 16 shown in FIG. 2 comprises deriving a hash for that location from the set of temporal spacing's for that location. This can be done for every location identified, or a subset of them.

The temporal event hash may then be used to identify a frame, GOP, MPEG4 fragment, essence data, or other form of video data from a database.

Figure 3:
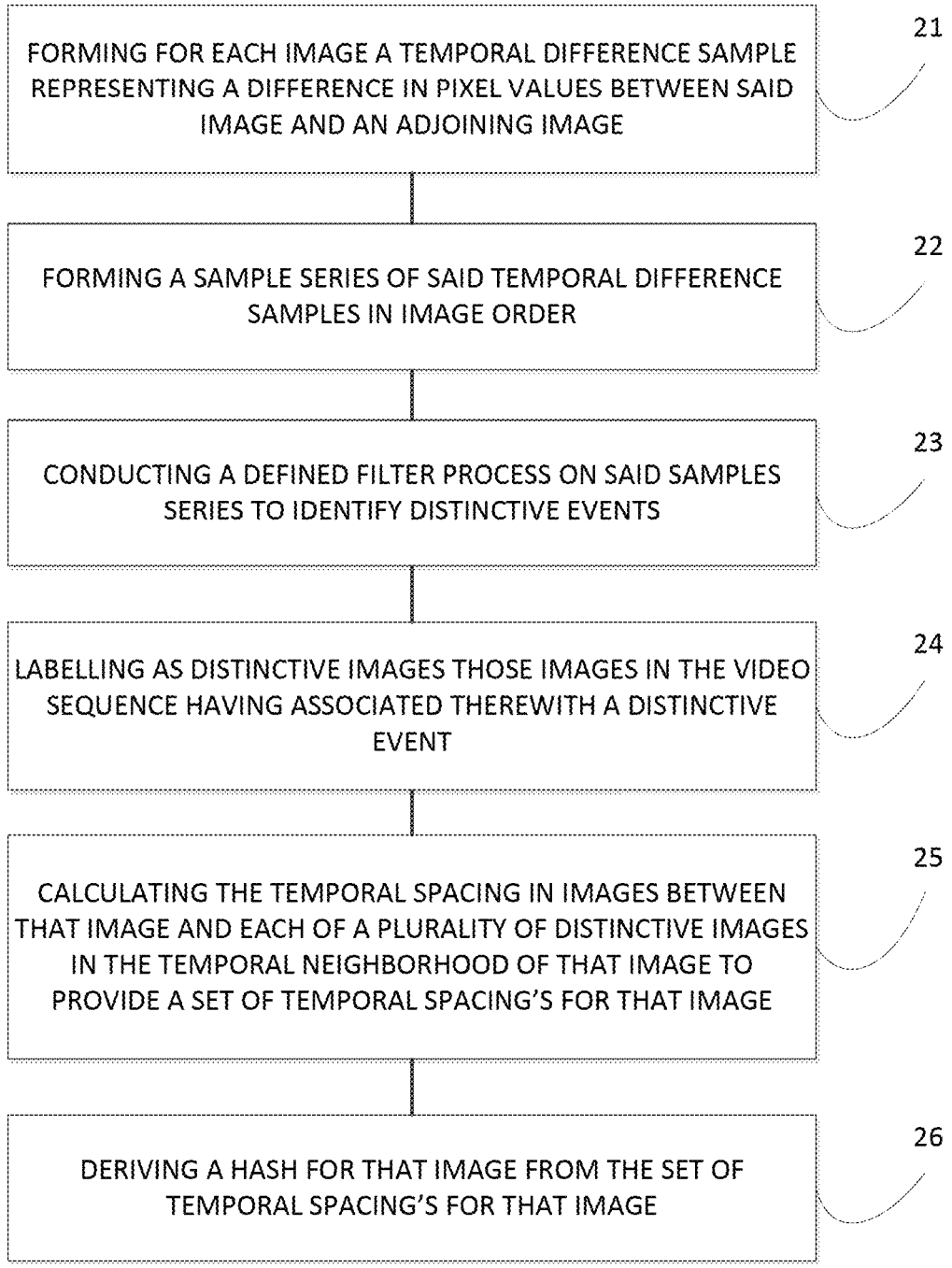
FIG. 3 shows a second flow chart illustrating a further embodiment of the invention.

FIG. 3 shows a method of generating a hash for an image in a video sequence of images.

The first step 21 is forming for each image a temporal difference sample representing a difference in pixel values between said image and an adjoining image. Alternatively the image may first be split into segments, and the pixel value of each segment averaged. This average pixel value may then be compared with the corresponding average pixel value (in the same spatial location) in the adjoining image. The resulting temporal difference data may be rectified so that a modulus is taken of all the data, so that only positive values are produced.

The next step 22 is forming a sample series of said temporal difference samples in image order.

The third step 23 consists of conducting a defined filter process on said sample series to identify distinctive events.

The fourth step 24 comprises labelling as distinctive images those images in the video sequence having associated therewith a distinctive event.

And step five 25 includes calculating the temporal spacing in images between that image and each of a plurality of distinctive images in the temporal neighbourhood of that image to provide a set of temporal spacing's for that image.

The final step 26 is deriving a hash for that image from the set of temporal spacing's for that image.

Figure 4:
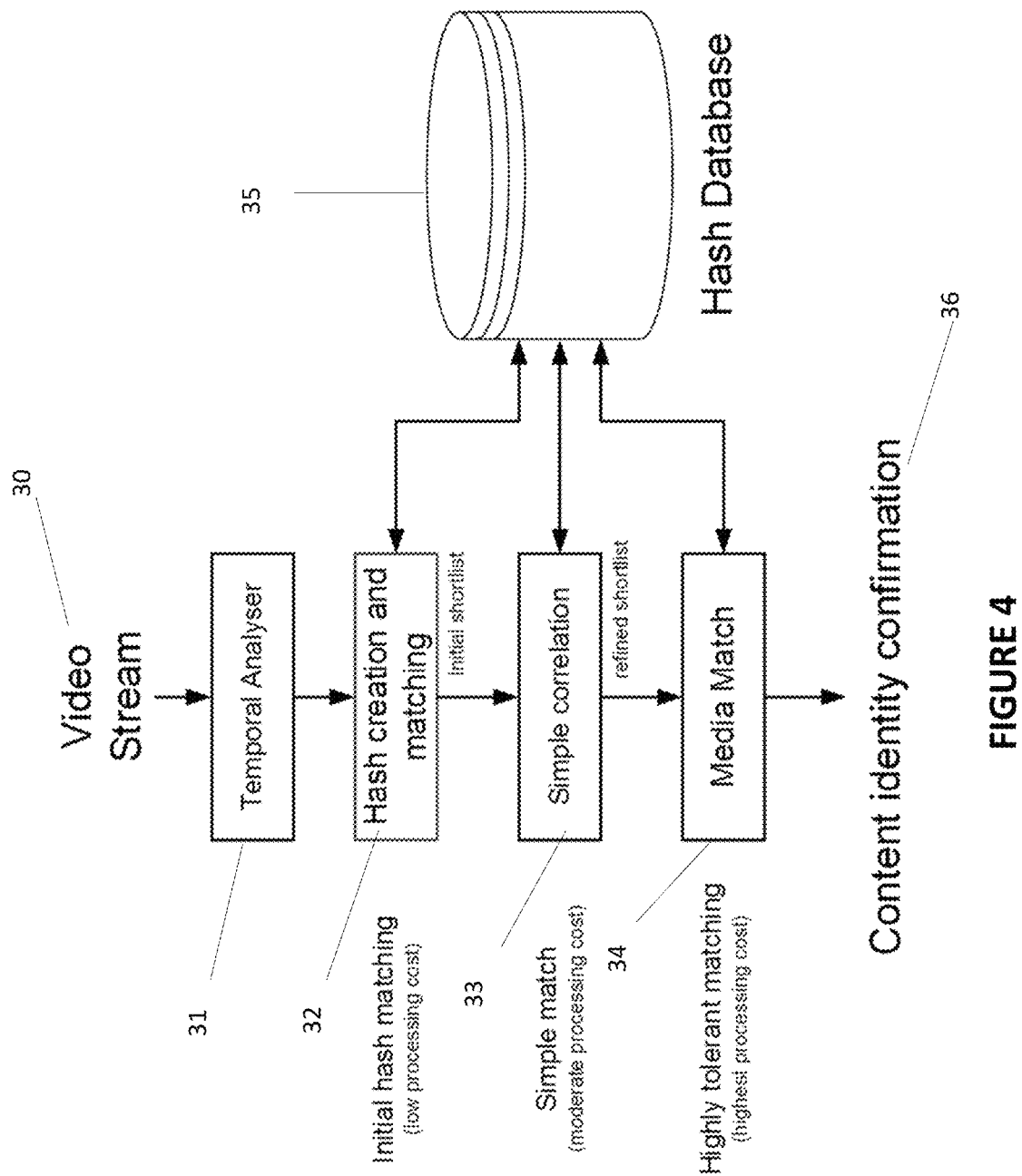
FIG. 4 illustrates a flow diagram showing one implementation of the invention.

FIG. 4 shows one method of matching video with the content of a video database. This method comprises a series of progressively more computationally expensive matches that are used to whittle down the amount of candidates for matching content.

FIG. 4 shows the steps of temporally analysing 31 the video stream 30, creating hashes for the video stream and matching them 32 with hashes stored in the hash database 35. Based on those results the initial shortlist goes through a more comprehensive simple correlation stage 33 to find a refined shortlist. These matches are then tested using a media match 34. These stages are set out in more detail below.

The video stream 30 is the content to be matched or compared. This could form the basis of a query for the video database. The video stream 30 may be sent to the computational device shown in FIG. 1 via the interface.

In the first step the video stream is fed through a temporal analyser 31 (this may be incorporated in the processor 6 in the computational device 2 shown in FIG. 1). The temporal analyser 31 may create temporal difference data by comparing each image in a video sequence with an image close in proximity to it in the video sequence, and temporally before it. In some embodiments an image will be compared with the image immediately preceding it in the video sequence, and in other embodiments it will be compared with another image, for example the image two images before it in the sequence. The difference between the images (for example by comparing the luminescence of regions of the images, or by comparing the luminescence of each pixel value) may then be found. This value is then the temporal difference data for that image. This will create a series of temporal difference data points for the video stream. In some optional embodiments the temporal analyser may also identify feature points of images in a video stream, as well as finding spatial differences between images in the video stream, or audio differences between images in the video stream.

In some embodiments the temporal analyser 31 involves a defined filter process including forming, for an image in a video sequence of images, a temporal difference sample representing a difference in pixel values between said image and an adjoining image. It may be advantageous for the adjoining image to comprise the preceding image or the next preceding image having the same parity. Video files may often comprise images in an interlaced standard, and therefore comprise images that are either part of a top field or a bottom field. By comparing an image to the next preceding image having the same parity this means comparing a top field image with the next preceding top field image, or a bottom field image with the next preceding bottom field image. The temporal difference sample for an image may be a single number for each image, preferably representing a difference in pixel luminance values between said image and an adjoining image. The defined filter process comprises a temporal averaging of said temporal difference samples, preferably a rolling average and preferably a rolling average over ten or more preceding images. The defined filter process may comprise the identification of maxima in a local region, or regions of large rate of change, or zero crossing points. The defined filter process may also comprise identifying minima points. A rectifier may be used so as to change the minima points to maxima. A rectifier may perform a modulus function on the data so that all of the data points are above the zero value. Therefore the minima will also be construed as being maxima points after rectification.

The resulting temporal difference data points from the temporal analyser 31 are fed into a hash creation and matching element 32. This may also be incorporated into the processor in the computational device shown in FIG. 1.

The hash creation may be done by ordering the video stream temporal difference data points temporally and calculating the maxima points, regions of large rate change, or zero crossing points (or a combination of such points) in the sequence. A derivative or equivalent may be used to find the maxima points. The derivative of the temporal difference data may also be rectified such that a modulus is taken. Therefore all of the minima may appear as maxima in this case. Therefore the identification of maxima may include the identification of minima as well in some examples. These may then be identified as distinctive events, and the sequence of distinctive events for the video sequence, or a portion of it, then forms the hash (or multiple hashes). In some embodiments series of five distinctive events together form a hash. Such a hash could be used to identify the portion of the video stream containing the five distinctive events. The time, or number of images, between each of the distinctive events forms the temporal spacing's that comprise the hash. The location of each of the identified distinctive events may be defined by a time code or other time measure. The other measure may involve a number of images in the sequence, or another equivalent measure.

Based on the calculated maxima, identified as distinctive events, N temporal spacing's are calculated for each image in the image stream, and N hash values are derived for each distinctive event. Each hash value being derived from N−1 of the temporal spacing's with a different temporal spacing being omitted in each of the hash values for that location. This creates multiple hashes, with each hash assuming that one of the identified distinctive events is spurious, and so omitted from results. This ensures that a content match is not missed because of a spurious distinctive event. In one embodiment each hash value may be derived from the temporal spacing's, with one or more different temporal spacings being omitted in each of the hash values for that location The identification the distinctive events may comprise labelling as distinctive images those images in the video sequence having associated therewith a distinctive event.

In the process of hash creation, it may be advantageous to reduce the noise in the temporal difference data points, and only record the more significant distinctive events in the video stream. This may reduce the chance of spurious events being identified. One way of doing this is to use a rolling box sum, or another moving average function to smooth the high frequency noise in the temporal difference data points. The resulting smoothed curve may then be analysed as described above in order to identify the distinctive events.

Still more advantageously, the smoothed out temporal data point curve may be filtered, for example using a comb filter. The maxima in the (absolute value of the) comb filter output correspond to x-co-ordinates where the second curve is varying most rapidly. Typically, this is advantageously near to a maxima point in the second curve. This will reduce the amount of spurious results. The resulting curve may then be analysed as explained above. Other known filter methods may be used in order to reduce the number of spuriously identified distinctive events.

In some embodiments the video stream 30 may include video that has 3/2 pulldown. This means that an image in the video stream is shown three times, and the subsequent different image in the video stream is shown twice. This is common in content produced at 24 frames per second when broadcast at 60 Hz or 59.94 Hz. Before forming hashes of the video stream it may be advantageous to identify 3/2 pulldown, or any other image repetition in the video stream. The video stream can then be edited so that the pull down (and the associated repeated images) is removed so that the video stream can be matched with standard format content (with no repetition)

It is noted that the hash database 35 forms part of the video database. Each piece of content stored in the video database will have corresponding temporal difference data points and hashes associated with it created before the comparison with a video stream. This is because when responding to a query time is the limiting factor, and therefore a real time conversion of content into hashes would involve too high a processing cost and be time inefficient. Therefore a database of hashes is created as part of the video database. As well as temporal event hashes other hashes such as feature point hashes may be created for each piece of content store in the video database. The hash database may contain a plurality of different hash types, with each piece of video content having an associated one or more hashes in the hash database.

The hashing matching element 32 compares the temporal event hashes with the temporal event hashes stored in the hash database 35. The hash database 35 then returns the initial shortlist of possible content matches in the database to the hash matching module. The initial shortlist may be made up of complete matches, or partial matches of the video stream hashes. In some embodiments it may be assumed that the initial shortlist is a complete list of content matches in the hash database. However, in some embodiments these are checked using a simple hash correlation 33 and/or a media match 34.

The shortlist is passed to the simple correlation module 33. This too may be incorporated in the processor 6 in the computational device 2 shown in FIG. 1.

The simple correlation 33 is used to check that the results included in the initial shortlist are genuine. It is more computationally expensive (per comparison) than the hash matching stage. It may involve the temporal difference data points (or a portion thereof) derived by the temporal analyser 31 being compared with the temporal difference data points of each of the video files from the initial shortlist.

In another embodiment the simple correlation 33 may not use temporal difference data points to compare with the hash database, but could rather use spatial, feature point, or audio hashes of the video stream to be compared with the results of the initial shortlist. In some embodiments different types of hashes may be used in combination with one another in a multi-stage simple correlation. The use of different types of hashes may assure that any spurious matches are identified. In one advantageous embodiment the initial matches using the temporal hashes are then checked using feature point hashes. The initial shortlist results that correlate with the feature point hashes are likely to be genuine content matches.

The next match is also optional. It is a media match module 34. This also may be implemented using the processor of the computational device shown in FIG. 1. This match comparison involves correlating the video stream with video stored in the hash database (or in the video database). This takes more computational power (and therefore it is not possible to perform such a comparison for every piece of content stored in a time efficient manner), but is more accurate. In some embodiments this correlation may involve comparing longer segments of the temporal difference data point curve, or other data associated with the video stream, with video files in the video file database. This comparison looks for the match between the files, as well as correlation between the delay values of the files. This correlation is a measure of the consistency of delay over matches of successive images between the query item and database entry (starting from a given shortlist starting point. i.e. an image number or time index). In one embodiment this correlation may be found by correlating and measuring the offset (delay) for each image in the video stream. Because the media matching increases the processing cost per matched candidate, decreasing the number of matched candidates through reducing the number of spurious results, increases the efficiency of the method and system. If the delay values of the files consistently match this is an indication that the content of the files matches one another. Therefore in the event that there are a low number of matches on the refined shortlist the media match is a good last check, to ensure that the matches are genuine.

The content identity confirmation 36 is the output of the system. This confirms the content found in the video database is a true match with the video content of the video stream input.

Figure 5:
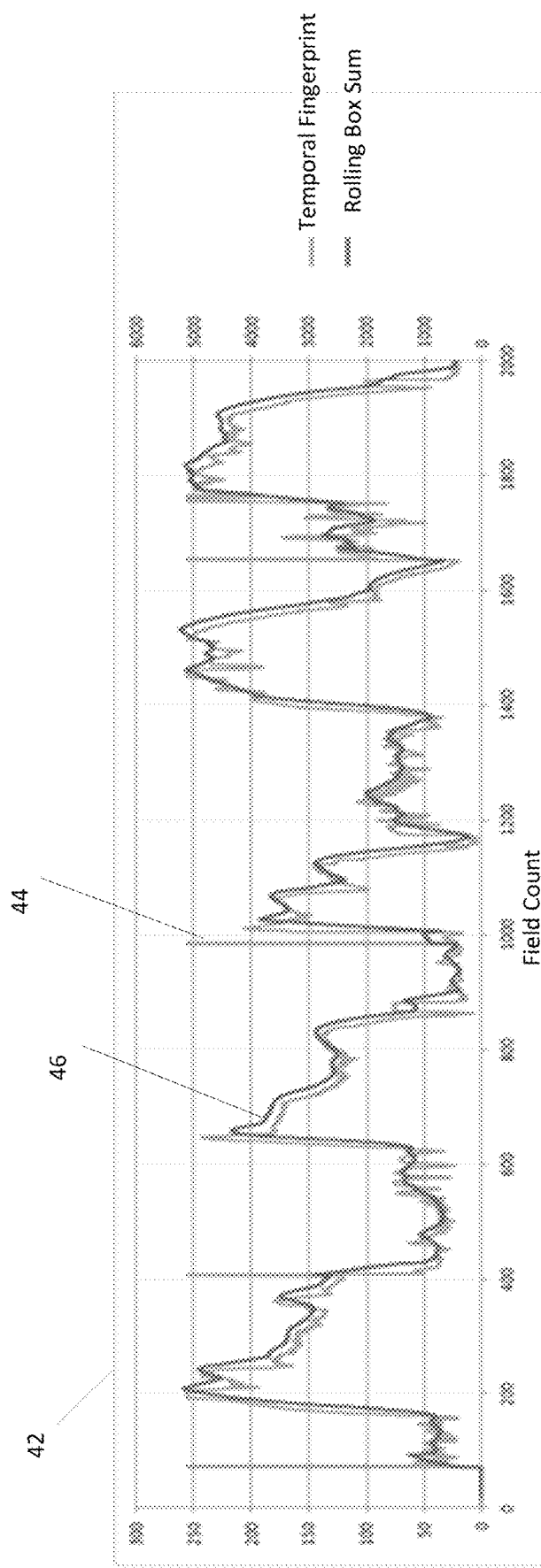
FIG. 5 shows a first graph illustrating the first stage of analysis in one embodiment of the invention to identify distinctive events in a video stream.
Figure 6:
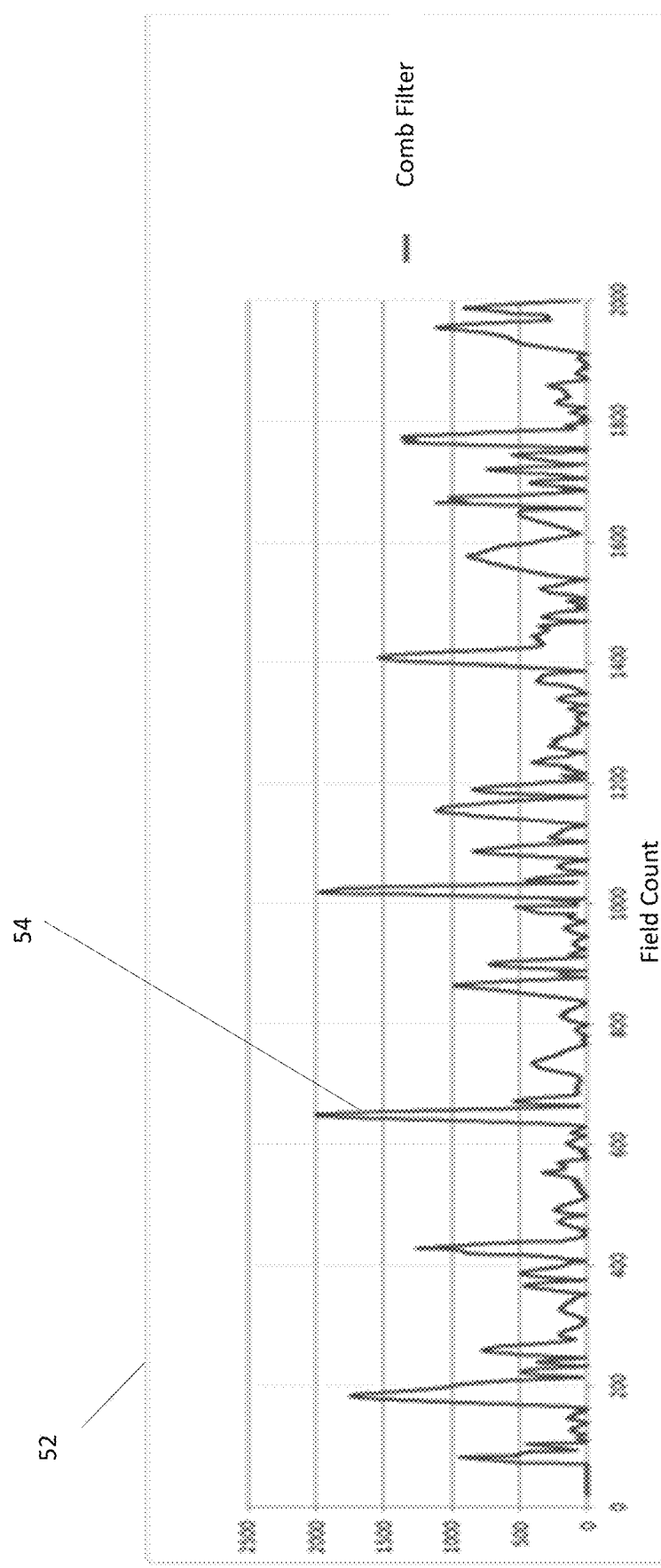
FIG. 6 shows a second graph illustrating the second stage of analysis in one embodiment of the invention to identify distinctive events in a video stream.
Figure 7:
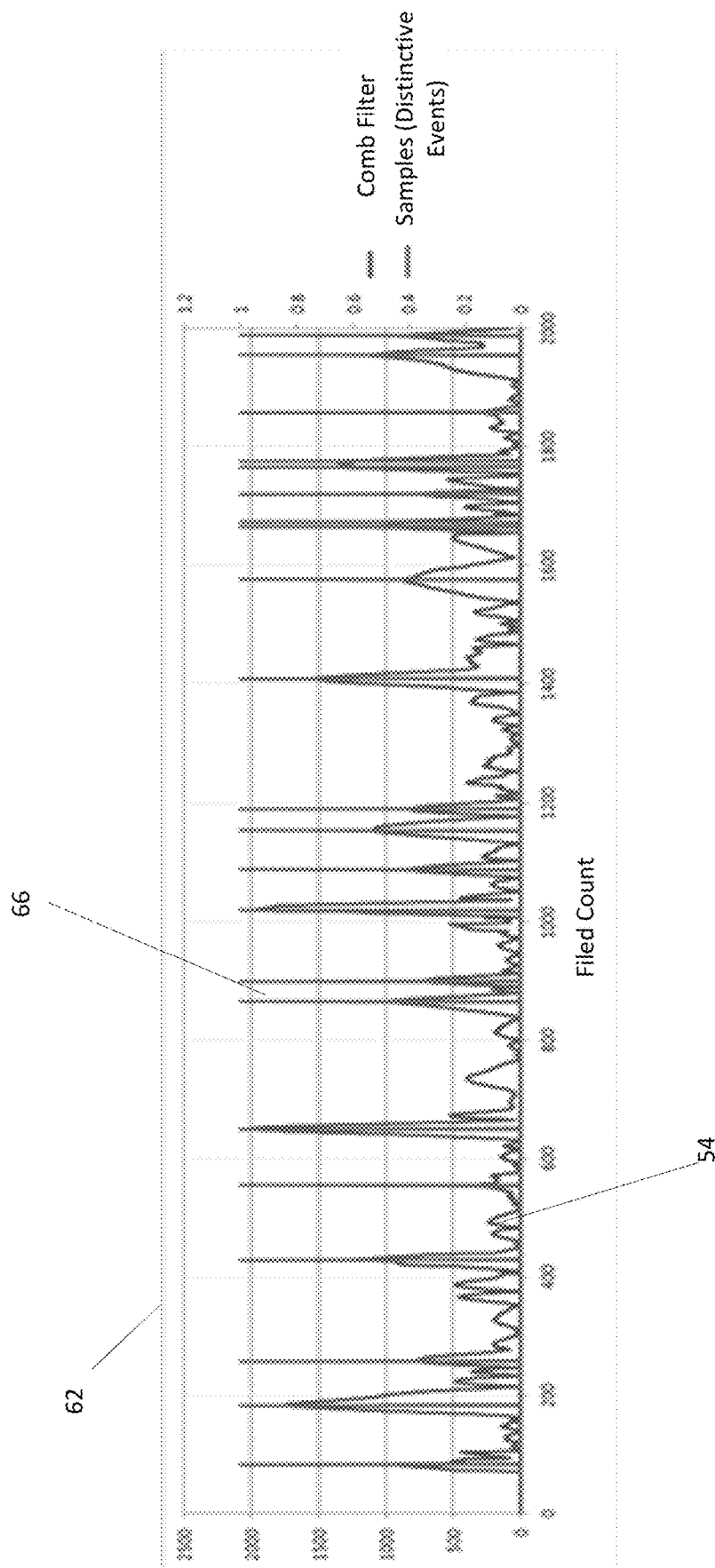
FIG. 7 shows a third graph illustrating the third stage of analysis in one embodiment of the invention to identify distinctive events in a video stream.

FIGS. 5 to 7 show graphically a method of identifying distinctive events in a video steam, according to one embodiment.

FIG. 5 is a graphical representation of the event identifying process in the creation of the temporal event hashes 42. The graph comprises of two curves, a first curve 44 and a second curve 46. The first curve 44 has significantly more noise and peaks, and the second curve 46 follows a rolling average of the first curve.

The graph 42 shows a temporal difference data points of each image in a video sequence. This is shown by the first curve 44. This may be a measure of the difference between an image and the previous image in a sequence, or it may be formed in another way that measures the temporal change in the sequence.

The second curve 46 is a rolling average of the first curve 44. This is to smooth out any peaks that may be spurious. For example, transient or high frequency changes may be considered spurious and it may be advantageous to suppress the identification of such events.

FIG. 6 shows a third curve 54. This is the result of a comb filter of the second curve 46 of FIG. 5. The comb filter is designed to identify regions of large rate change (which often correlate with peaks), and their relative sizes, of the second curve 46 in FIG. 5. In other embodiments other types of filters may be used and the defined filter process may operate to identify edges in the input signal or in a filtered version of the input signal.

Curve four 66 in FIG. 7 shows the result of identifying the maxima points in the third curve. The fourth curve 66 is the series of delta-like peaks. This identifies the distinctive events upon which the temporal event hashes are based. In alternative embodiments other filtering means and methods may be used. In the simplest case the maxima of the first curve 44 may be found, and these may be labelled as distinctive events.

The x co-ordinate (or temporal index) of the peaks are then identified as distinctive events, and can be used in the manner shown in any of FIGS. 2-4, or as described in the statements of invention, or in the appended claims. For example the sequence of temporal distinctive events can be used to form a temporal event hash which can be used to identify content in a video database.

Additionally, in the process of identifying distinctive events in a video stream, in some embodiments it may also be advantageous to have a buffer. This may enable distinctive events at one point in the video stream, and distinctive events at another point in the video stream, a set time apart, to be compared with a video file in the video database simultaneously. The distinctive events at each point may be used to calculate the temporal spacing's of the distinctive event, and said temporal spacing may be calculated in modulo operation in the interests of efficiency.

The step of calculating temporal spacing's may therefore further comprise calculating the temporal spacing between a location offset from that location by a defined time interval and each of a plurality of distinctive events in the temporal neighbourhood of that offset location to provide an additional set of temporal spacing's for that location. The step of deriving a hash at that location may comprise deriving a hash from the set of temporal spacing's and the additional set of temporal spacing's for that location.

The hashes from the first set of distinctive events and from the offset series of distinctive events may be combined into a single hash for comparison. Such a combination may or may not have synergy between the offset hashes. For example, if the hashes are calculated after being filtered, the single hash may include a value that describes the filtration of both sets of hash values.

Figure 8:
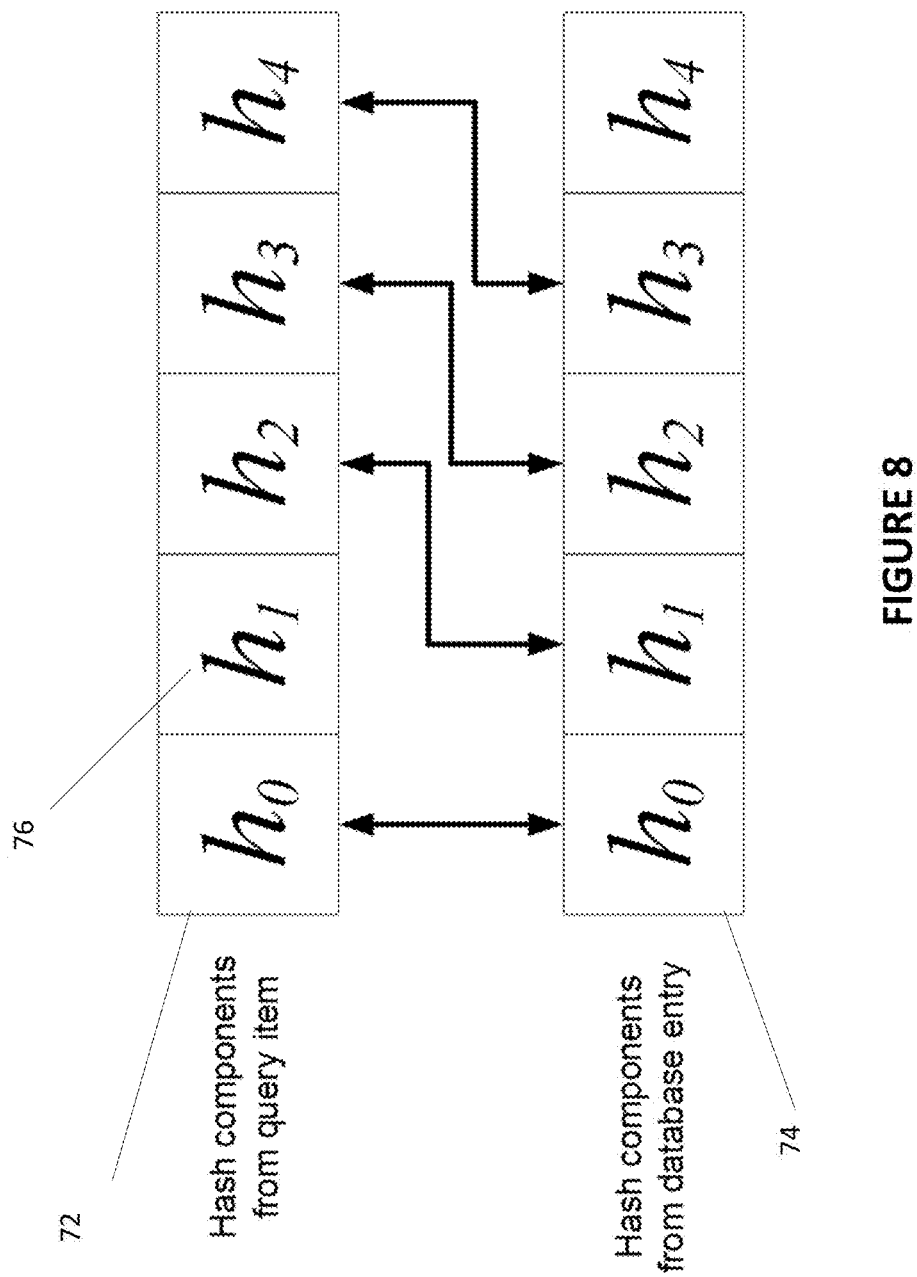
FIG. 8 illustrates one embodiment in which content matches are identified despite a spurious distinctive event being identified in the video stream content.

FIG. 8 shows hash components from a query item 72. These components may each represent a distinctive event identified in the video stream, as shown in FIG. 4. In FIG. 8 the hash in the query item has an additional component $h_1$ 76 that is spurious. It is possible that, despite best attempts, a spurious distinctive event may be identified in the video stream. Clearly the method outlined above uses the distinctive events in the comparison with the content in the video database. It is therefore it may be advantageous to have a way of ensuring that spurious events do not stop content true matches from being identified.

FIG. 8 shows one method of identifying matches when additional spurious events 76 are detected. In FIG. 8 there are five query items in the hash 72. Therefore all combinations of four query items (with the correct order retained, e.g. if the second query item is omitted as being spurious, the order remains query item 1, 3, 4 and 5) are compared with the hash components 74 from the hash database in the video database. In this example one such query combination (of the $1^{st}$, $3^{rd}$, $4^{th}$ and $5^{th}$ query items) is a match to the first four query items of the hash of a database entry 74. Therefore this is identified as a match, despite the spurious second hash query item. This will increase the number of spurious matches, however it should not increase it significantly, and further testing allows any (or at least a great proportion of the) spurious matches to be removed from the match list.

In some embodiments all of the components are also compared (in the example in FIG. 8, all five query items would be compared, and in the case a match would occur only where there are no spurious events). In some embodiments the full hash is compared first to create one initial result list, and the partial hash comparisons are then performed, and the additional results are stored in a separate list. The results on this list may be subject to a further test to ensure that they are not false matches.

Figure 9:
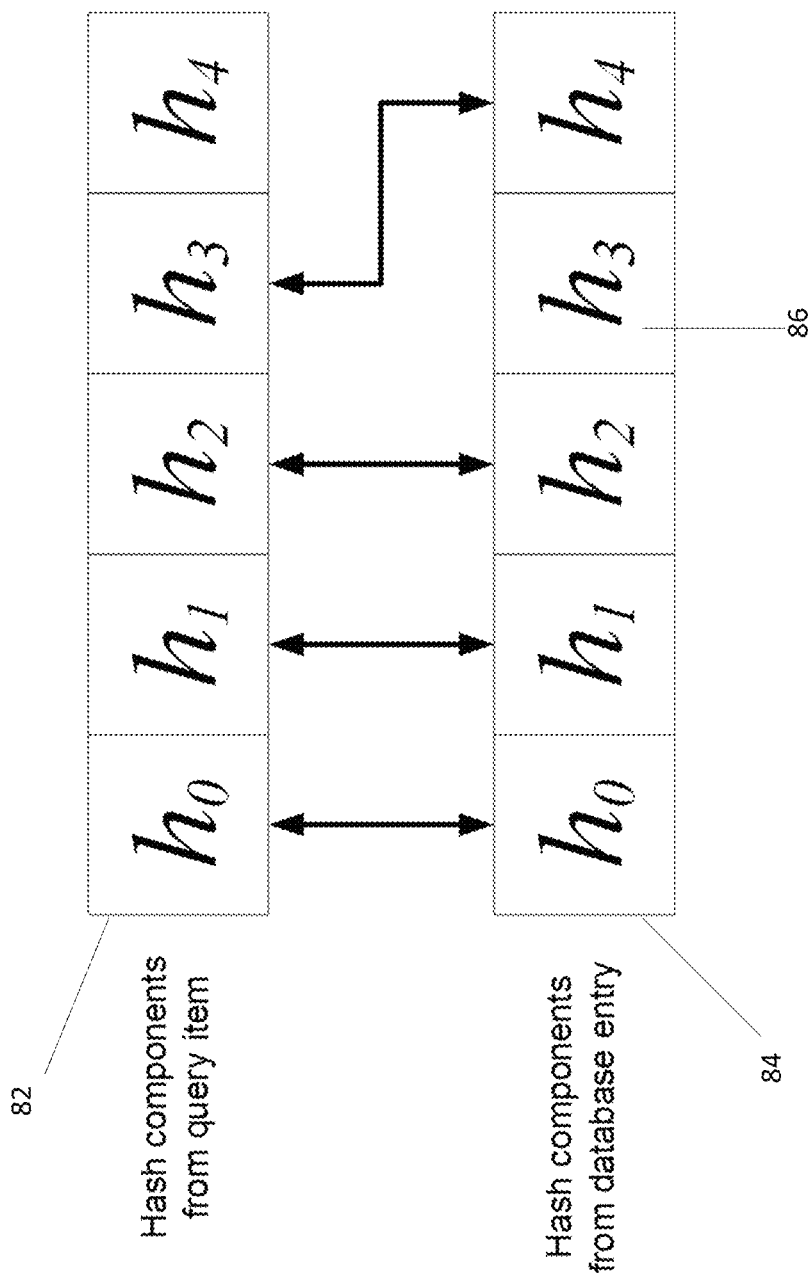
FIG. 9 illustrates one embodiment in which content matches are identified despite a spurious distinctive event being identified in a file stored in the video database file.

FIG. 9 shows a scenario in which the hash components from the video database 85 contain a spurious result 86 (in this case $h_3$). FIG. 9 could also represent the scenario in which one of the hash components has been missed from the query item, for example if a peak fell below the criteria for detection. In this case it is necessary to compare the first four query items of the video stream hash 82 with all combinations of four query items in the video database hash 84 (the query items kept in the correct order as above). This will identify that the two hashes are a match, despite the spurious query item in the video database hash.

In some embodiments it may be advantageous to perform both partial matches (for all possible combinations of the video stream hash, and all the possible combinations of the video database hash). In some embodiments it may be possible to determine if one of the hashes is of higher quality, or is less likely to have spurious query items or distinctive events within it. This may be because the hash is derived from a higher quality video source, such as a higher frame rate, resolution, or contrast, and therefore it is less likely for an error to occur. In this case the better quality hash (either the video stream or the content from the video database being compared) is presumed to be perfect, and therefore only one set of partial hatch matches is required.

Figure 10:
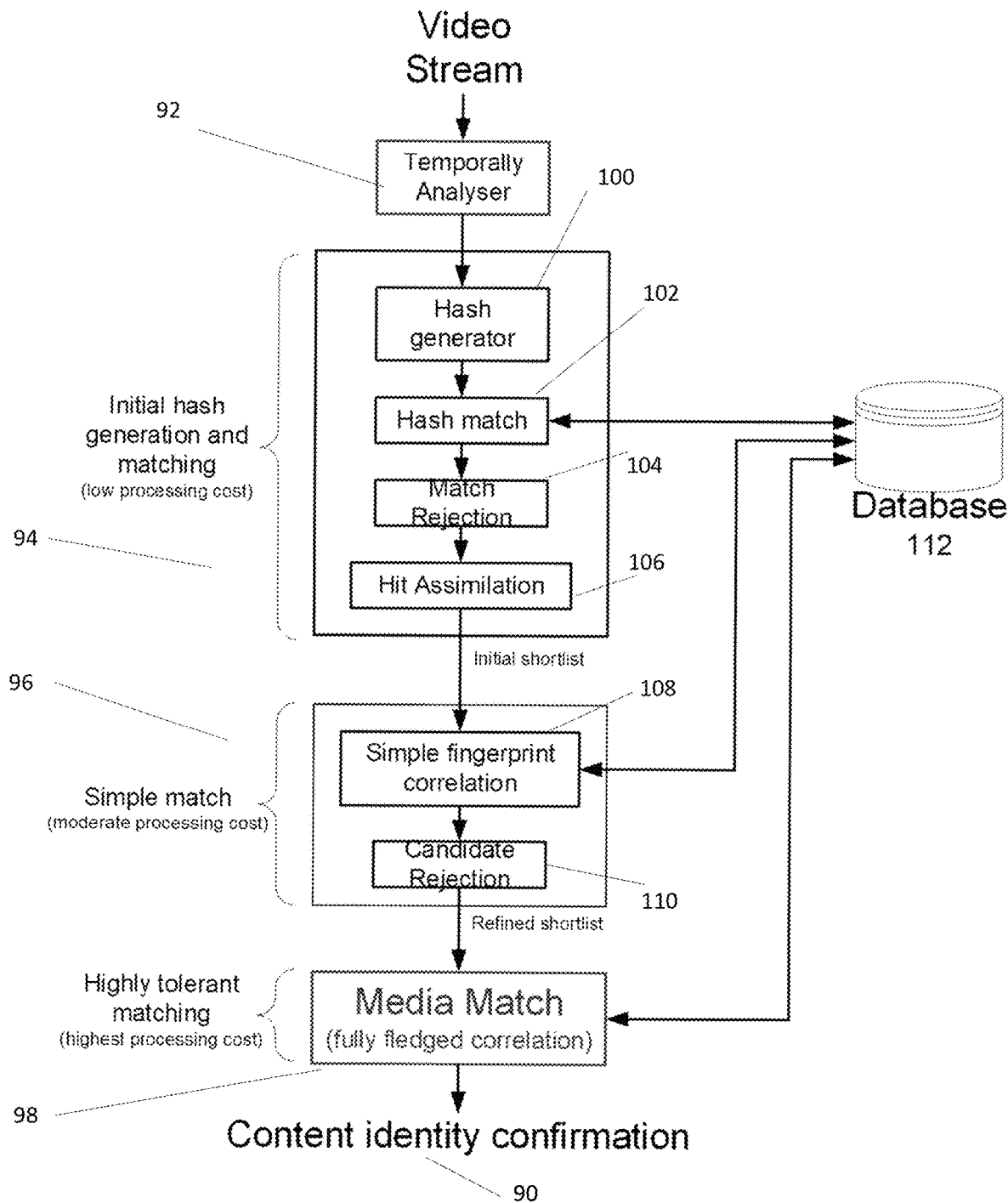
FIG. 10 shows a flow diagram showing one implementation of the invention in further detail.

FIG. 10 shows a more detailed flow chart for how to perform the content matching method.

As shown in FIG. 4 the flow chart comprises a video stream, a temporal analyser 92, an initial hash generation and matching module 94, a simple matching process 6 and a high tolerant matching process 98. There are all set out in more detail in FIG. 10.

For example, the initial hash and generating module comprises four processes. The first of these is a hash generator 100. This takes the temporal data points generated in the temporal analyser 92 (and that may be represented the first curve of FIG. 5) and creates hashes out of the temporal data points. This may be done in accordance with the method outlined with respect to FIGS. 2-4, FIGS. 5-7, or any of the appended claims. For example, the hashes may be formed by performing a rolling average on the temporal data points over time, comb filtering the resulting values to find events, and then identifying the maxima points of the filtered result values (and optionally rectifying the data so that minima points are also identified) and identifying the locations of the maxima as the distinctive events.

The second of the processes is a hash match 102. This is comparing the distinctive event hashes with those held in the video database 112. This may be done either using the full match, or a partial match as outlined with regard FIGS. 8 and 9. This match will return an initial shortlist that can be whittled down further in the initial hash generation and matching phase.

The third process is match rejection 104. This involves reducing the number of matches if the number of matches is too high. For example if a piece of content is searched and it is believed that there are very few matches contained within the video database, and yet there appear to be many matches (for example over 5000) then it is necessary to reduce the number of results. One way to do so is to reduce the match tolerance. This could be done by only accepting absolute matches, rather than partial matches, or through reducing the tolerance through other means. Additionally in some embodiments it may be advantageous to reject matches that are not consistent over a minimum time scale. In the event that the database contains multiple versions of the content then it would be expected that particularly distinctive sections of the video stream would match with the each of the video files of identical content stored in the video database. Therefore the same section of the video stream would register multiple matches. If a section of the video stream has few matches, or only one match, this is more likely to be spurious. Therefore it can be rejected. As there may be multiple entries in the database which are genuine hits, what this is doing is tracking the hypothesis that a given hit against a given entry is consistent over time. In some embodiments the process of match rejection, or at least some part of it (for example the rejection of matches that are not consistent over a minimum timescale), is performed after the hit assimilation has been performed.

The fourth step is hit assimilation 106. It is possible that the same distinctive event may be identified a plurality of times in the same video stream, and therefore the initial shortlist of matches may contain several results from the same entity in the video database that are temporally close to one another (as these will have similar values). As these results are similar to one another it does not make sense to have what are essentially duplicate results in the list, as this is inefficient and has a computational cost. Especially as the later matching processes (such as media match) will be able to identify which part of the video file of the video database is the best match. Therefore for the sake of efficiency these duplicate results are assimilated together. In some embodiments this may be performed by sorting hits from a single entity into temporal order and then using a clustering approach to group entries closer than a specified distance together.

The simple match process involves two parts. First, a simple correlation 96 on each member of the shortlist is performed. This involves reading and buffering 3 seconds worth of each shortlists temporal data points, and then running a basic minimum absolute difference between a 1 second section of the query item and the 3 seconds of the shortlist item (i.e. a +/−1 second test). This entails greater effort than the hash look-ups, but it is not the full media match; there is no recursive filtering, the measurement range is much smaller than media match, only the video temporal data points are correlated (no audio, captions, or metadata correlation etc.) and the confidence values are the very basic minimum absolute errors The second process is candidate rejection 110. A candidate on the initial shortlist is rejected if the correlation in the simple correlation is too low. For example if it is below a set threshold for correlation (which may be set at 75%, for example) then a result will be rejected. The candidate rejection may in some embodiments further comprise rejecting matches that are not consistent over a minimum time scale, as described above with respect to the match rejection stage.

Finally the full media match is performed and the matches in the video database are returned in the content identity confirmation. A full media match 98 will fail very quickly for any spurious matches that are still in the shortlist.

Figure 11:
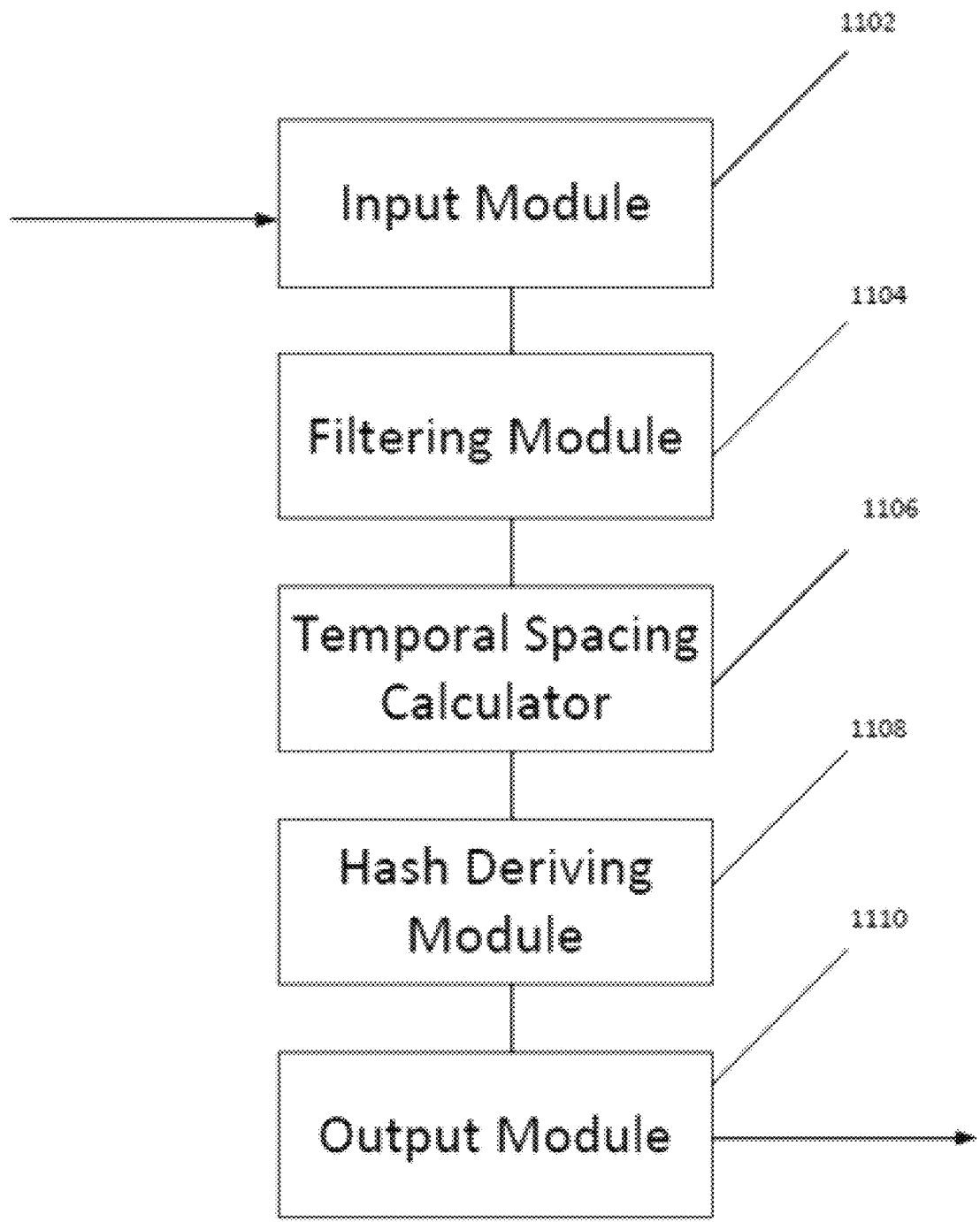
FIG. 11 shows a modular apparatus that may be used to implement the invention.

FIG. 11 shows one exemplary apparatus that may be used to implement the invention. FIG. 11 shows an input module 1102, a filtering module 1104, a temporal spacing calculator 1106, a hash deriving module 1108, and an output module 1110. It is noted that these apparatus may be separate individual apparatus, or may be combined together in a larger apparatus. For example, the filtering module, temporal spacing calculator and hash deriving module may be implemented by processor 4 of FIG. 1. The input module 1102 and output module 1110 may be implemented by the interface 8 of FIG. 1.

The input module 1102 may be configured to receive a video signal formed of a series of videos. This may be received from a memory device, such as data storage 6 shown in FIG. 1, or it may be received from an external device. The video signal may be received from a separate device via a network, such as the internet, or by another connection, either wireless (e.g. Wi-Fi or Bluetooth) or wired, such as through a direct physical connection.

The filtering module 1104 may be implemented to perform the filtering methods as described above. For example, the filtering module may compare each image in the image series with other images in the nearby vicinity in the image series to find the temporal differences between images close to one another in the image series. The filtering module may then filter the resulting temporal difference data to identify regions of large rates of change in the difference data. The relative magnitude of the temporal difference data at the points at which there is a large rate of change may also be identified.

The temporal spacing calculator 1106 may identify distinctive temporal events based on the identified regions of large rate changes, and the magnitude of the temporal difference data at this point. For example if there is a large rate of change and a large value in the temporal difference data a distinctive event may be identified. The temporal spacing calculator may then calculate the relative spacings between each of the identified distinctive events in a temporal neighbourhood of the image series.

The hash deriving module 1108 may derive a hash from the set of temporal spacings for that location. This may allow a fingerprint to be built up for the image series based on a series of hashes.

The output module 1110 may output the hashes derived by module 1108. The hashes may be output to either a further module for further analysis, or to a memory device for storage, or to an external device.

This apparatus shown in FIG. 11 may be used for the production of a data bank of hashes for a plurality of image series. This will allow these hashes to be compared to other image series or video signals to find matches for the other image series in the data bank. This identification of content reduces the chance of a match being incorrectly identified, as well as reducing the computational expense, and the energy required, for performing the matching process. These matches can be sued to identify that video signals of different formats have the same content, or for example that image series associated with different language versions of the same content may be identified.

Figure 12:
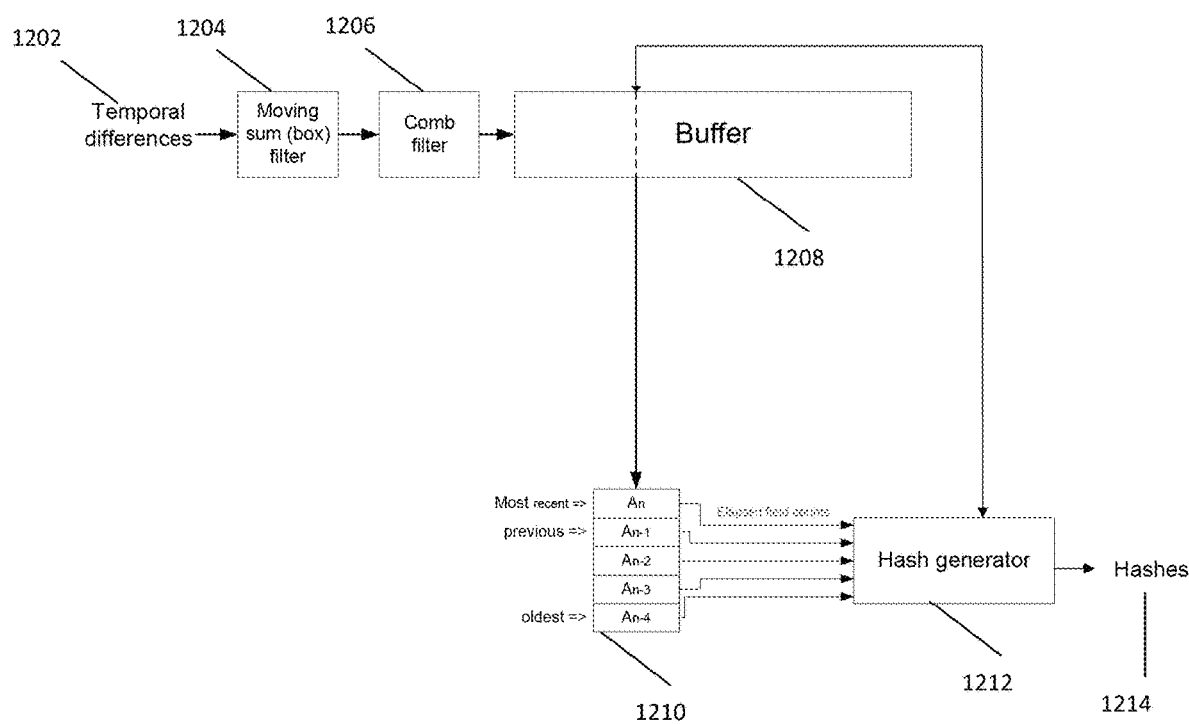
FIG. 12 shows an apparatus that may be configured to generate a hash to characterise temporal difference data.

FIG. 12 shows an apparatus configured to generate a hash to characterise input temporal difference data. FIG. 12 shows the apparatus comprising moving sum (box) filter 1204, comb filter 1206, buffer 1208 and hash generator 1212. Also shown in FIG. 12 are temporal differences 1202, identified distinctive events 1210, and output hashes 1214.

The temporal differences 1202 that are input to the apparatus indicate the difference between images in an image series such as a video file. The temporal may be determined by comparing an image in the image series to the image preceding it in the series. The luminescence at each pixel, or for a group of regions, may be compared. The differences in luminescence may then be used to form a temporal difference value for the image to the previous image in the series. Calculating this value for every image in the series may result in the temporal differences 1202 that are input to the apparatus.

Moving sum filter 1204 may be configured to receive the temporal differences 1202 and perform a temporal averaging of the temporal differences. This may form an average of several temporal difference values in the vicinity of the image series. For example the preceding two temporal difference data points, and the proceeding two temporal difference data points may be averaged to calculate a rolling average for the temporal difference data. This may be done for all of, or at least a series of, the temporal difference data points. This acts a smoothing operation such that the amount of noise in the data is reduced. This enables the distinctive events in the image series to be identified without spuriously identifying noise as a distinctive event.

Comb filter 1206 may be used to determine the rate of change, however other filters or methods may be employed instead to determine the rate of change of the averaged temporal difference data. In the case of a comb filter so it may be designed to identify regions of large rate change (which often correlate with peaks), and their relative sizes. For example, it may identify regions that have a large change of rate, and that have a large magnitude of temporal difference in the same region. Regions with a large rate change, but a small magnitude of temporal difference data may be indicative of noise rather than a distinctive event. The comb filter may be employed because it advantageously can identify regions of large rate change and high magnitude effectively. Thus the comb filter may identify distinctive events from the rate of change, and optionally, the magnitude of the region of large rate change. The comb filter may be known as a second filter in the apparatus.

Buffer 1208 may comprise an arrangement for storing said distinctive events with the temporal location in the series of images of the associated image. These distinctive events may be needed in subsequent determinations, especially in relation to temporal locations close to the identified distinctive event. Therefore the buffer may act as a short term memory device so that the location of the distinctive events may be used without the need to request the locations from the memory, or to determine them from subsequently generated hashes. The buffer may receive feedback from the generated hashes such that if a location is required for a distinctive event the location may optionally be determined from the hashes generated. This may be advantageous if a lot of distinctive events are identified and the buffer is full. The buffer for instance may store distinctive event locations of the last 64 fields (or images in the image series).

Distinctive events 1210 may be output by either the comb filter 1206, or the buffer 1208 dependent on the apparatus architecture. A complete set of the distinctive event locations may be stored, or alternatively they may only be stored in the short term memory such that hashes may be generated using this information. One example of storage in short term memory may be for example in a circular buffer. Element 1210 shows the most recently identified distinctive event An, the previously identified event An-1, all the way through to the oldest event (in this case An-4, but it may well be An-m). The difference between these locations in terms of images in the image series may be stored. The relative locations of the distinctive events may be used in the creation of a hash.

Hash generator 1212 uses the identified distinctive locations to generate hashes for either the image series as a whole, or local portions of the image series. For example, the relative differences in location between a series of distinctive events may be recorded in a hash. This may be used to compare a new piece of content with to establish whether the new piece of content includes a portion with an identical hash. This would make the new piece of content a candidate for being a match with the image series used to generate the hashes. This may be useful in, for example, identifying copyrighted material, such as the highlights of sports events, or music clips, that a copyright holder may not want disseminated. For example, a video sharing website may employ a hash system to compare the hashes from copyrighted image series to newly uploaded content to check if the newly uploaded content includes material that cannot be shared without infringing the copyright. This comparison step is discussed in more detail with regard to FIG. 9.

Hash output 1214 shows the hashes output. The hashes may be used to form part of a hash database of content, or alternatively may simply be output to a memory, or local memory, or to an external device.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. These steps may also be performed on a single apparatus, or each step may be performed at a separate apparatus. The apparatus performing the method steps may include a data storage and a processor. Alternatively the functionality provided by the data storage may in whole or in part be provided by the processor. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The processor of any apparatus used to perform the method steps (and any of the activities and apparatus outlined herein) may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an so erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

The invention claimed is:

1. An apparatus for determining a distinctive event in a sequence of video images, comprising:
   a first filter configured to receive a series of difference sample values in at least one video image of the sequence of video images, with each difference sample value representing a difference in respective pixel values in the at least one video image of the sequence of video images, with the first filter configured to perform an averaging of the series of difference sample values;
   a second filter configured to determine a rate of change based on a magnitude corresponding to a difference between the averaged series of difference sample values of the at least one video image with an averaged sample series of at least one other video image in the sequence of video images, and further configured to detect a distinctive event based on the respective magnitudes indicating the rate of change for the difference sample values between the respective video images; and a buffer arrangement configured to store the detected distinctive event with a corresponding temporal location for a respective video image in the sequence of video images.

2. The apparatus of claim 1, wherein the second filter is further configured to detect the distinctive event when a peak of each respective magnitude is above a predetermined threshold.

3. The apparatus of claim 1, further comprising a hash generator configured to derive a hash for the respective video image based on at least one temporal spacing between the respective video image and the at least one other video image being in a temporal neighborhood of the respective video image having associated therewith the detected distinctive event.

4. The apparatus of claim 3, wherein, for a location of the at least one video image in the sequence of video images, the hash generator is further configured to calculate a temporal spacing between the respective location and each of a plurality of distinctive events in a temporal neighborhood of the respective location to provide a set of temporal spacings for the respective location.

5. The apparatus of claim 4, wherein the hash generator is further configured to derive the hash for the respective location from the set of temporal spacings for the respective location.

6. The apparatus of claim 1, wherein the difference sample values are temporal difference sample values in an image order of the sequence of video images, with each temporal difference sample value representing a difference in respective pixel values between the at least one video image and an adjoining video image in the image order.

7. The apparatus of claim 6, wherein the respective temporal difference sample value for each video image in the image order is a single number for each respective video image.

8. An apparatus for determining a distinctive event in a sequence of video images, comprising:

a first filter configured to perform a temporal averaging of a series of temporal difference samples in the sequence of video images, with each temporal difference sample representing a difference in respective pixel values between a video image and an adjoining video image in the sequence of video images;

a second filter configured to determine a rate of change based on a magnitude corresponding to a difference between the temporally averaged series of the video image with the temporally averaged sample series of the adjoining video image, and further configured to detect a distinctive event based on the respective magnitudes indicating the rate of change for the temporal difference samples; and a buffer arrangement configured to store the detected distinctive event with a corresponding temporal location in the sequence of video images.

9. The apparatus of claim 8, further comprising a hash generator configured to derive a hash for the respective video image based on at least one temporal spacing between the respective video image and at least one other video image being in a temporal neighborhood of the respective video image having associated therewith the detected distinctive event.

10. The apparatus of claim 9, wherein, for a location of the video image in the sequence of video images, the hash generator is further configured to calculate a temporal spacing between the respective location and each of a plurality of distinctive events in a temporal neighborhood of the respective location to provide a set of temporal spacings for the respective location.

11. The apparatus of claim 10, wherein the hash generator is further configured to derive the hash for the respective location from the set of temporal spacings for the respective location.

12. The apparatus of claim 8, wherein the respective temporal difference samples for each video image in the image order is a single number for each respective video image.

13. The apparatus of claim 8, wherein the second filter is further configured to detect the distinctive event when a peak of each respective magnitude is above a predetermined threshold.

14. An apparatus for determining a distinctive event in a sequence of video images, comprising:

means for averaging a series of difference sample values in at least one video image of the sequence of video images, with each difference sample value representing a difference in respective pixel values in the at least one video image of the sequence of video images;

means for determining a rate of change based on a magnitude corresponding to a difference between the averaged series of difference sample values of the at least one video image with an averaged sample series of at least one other video image in the sequence of video images;

means for detecting a distinctive event in the sequence of video images based on the respective magnitudes indicating the rate of change for the difference sample values between the respective video images; and means for storing in a buffer the detected distinctive event with a corresponding temporal location for a respective video image in the sequence of video images.

15. The apparatus of claim 14, further comprising means for deriving a hash for the respective video image based on at least one temporal spacing between the respective video image and the at least one other video image being in a temporal neighborhood of the respective video image having associated therewith the detected distinctive event.

16. The apparatus of claim 15, further comprising means for calculating a temporal spacing between a location of the at least one video image in the sequence of video images and each of a plurality of distinctive events in a temporal neighborhood of the respective location to provide a set of temporal spacings for the respective location.

17. The apparatus of claim 16, further comprising means for deriving the hash for the respective location from the set of temporal spacings for the respective location.

18. The apparatus of claim 14, wherein the difference sample values are temporal difference sample values in an image order of the sequence of video images, with each temporal difference sample value representing a difference in respective pixel values between the at least one video image and an adjoining video image in the image order.

19. The apparatus of claim 18, wherein the respective temporal difference sample value for each video image in the image order is a single number for each respective video image.

20. The apparatus of claim 14, further comprising means for detecting the distinctive event when a peak of each respective magnitude is above a predetermined threshold.

* * * * *